United States Patent [19]

Klabunde et al.

[11] Patent Number: 4,577,535
[45] Date of Patent: Mar. 25, 1986

[54] CONTOURING MACHINE WITH RADIAL SLIDE HEAD

[75] Inventors: Steven E. Klabunde; Edward H. Hankwitz; Charles Maastricht, all of Fond du Lac, Wis.

[73] Assignee: AMCA International Corporation, Hanover, N.H.

[21] Appl. No.: 384,744

[22] Filed: Jun. 3, 1982

[51] Int. Cl.[4] ............................................. B23B 3/12
[52] U.S. Cl. ..................................... 82/2 E; 408/152; 409/146; 409/191
[58] Field of Search ............... 409/190, 230, 146, 191; 82/112, 114, 2 E; 408/181, 158, 151, 152; 318/569

[56] References Cited

U.S. PATENT DOCUMENTS

| | | | |
|---|---|---|---|
| 1,962,951 | 6/1934 | Conwell | 409/230 X |
| 2,157,248 | 5/1939 | Swanson | 82/1.4 |
| 2,372,000 | 3/1945 | Johanson | 82/2 E X |
| 2,404,433 | 7/1946 | Christman | 82/1.4 |
| 2,430,026 | 11/1947 | Mealey | 74/840 |
| 2,495,583 | 1/1950 | Heron | 82/1.5 |
| 2,576,095 | 11/1951 | Benningkhoff et al. | 82/1.4 |
| 2,775,147 | 12/1956 | Schneebeli et al. | 82/1.5 |
| 2,822,709 | 2/1958 | Jeszka | 82/1.4 |
| 2,831,386 | 4/1958 | Woytych | 82/2 E |
| 3,113,475 | 12/1963 | Lombardo | 82/1.4 |
| 3,169,416 | 2/1965 | Carlson et al. | 408/1 R |
| 3,180,187 | 4/1965 | McFerren | 82/1 R |
| 3,228,265 | 1/1966 | Stoddard et al. | 408/158 |
| 3,290,965 | 12/1966 | Gaev | 82/1.4 |
| 3,311,003 | 3/1967 | Daugherty | 82/1.2 |
| 3,592,553 | 7/1971 | Heizer | 408/204 |
| 3,686,964 | 8/1972 | Thibaut et al. | 74/110 |
| 3,710,659 | 1/1973 | Pagella et al. | 82/1.2 |
| 3,902,386 | 9/1975 | Dressler et al. | 82/1.4 |
| 4,184,391 | 1/1980 | Eckle | 82/1.2 |
| 4,250,775 | 2/1981 | Jerue et al. | 82/1.2 X |
| 4,411,177 | 10/1983 | Batistoni | 82/2 E |

FOREIGN PATENT DOCUMENTS

| | | | |
|---|---|---|---|
| 2405694 | 8/1975 | Fed. Rep. of Germany | 82/1.4 |
| 2734126 | 2/1979 | Fed. Rep. of Germany | 82/2 E |
| 526073 | 9/1940 | United Kingdom | 408/158 |
| 2066128 | 7/1981 | United Kingdom | 82/2 E |
| 309576 | 8/1970 | U.S.S.R. | 82/1.2 |
| 755453 | 8/1980 | U.S.S.R. | 82/1.4 |

Primary Examiner—William R. Briggs
Attorney, Agent, or Firm—Edward W. Osann, Jr.

[57] ABSTRACT

A two axis numerically controlled contour boring machine adapted for interior and exterior machining operations such as boring, facing, grooving, turning and back-facing. The machine comprises a headstock slidably driven along a first axis by a feed motor. The headstock supports a rotatable contouring head having a radial slide which is driven along a second axis perpendicular to the first axis. The radial slide is spindle actuated and includes adjustment means for removing backlash in the drive. The radial slide is adapted to hold quick disconnect type tools selected for the particular machining operation or operations called for by the machining program. The desired contours are generated in the workpiece by the combined motion of the headstock and radial slide along their respective axes under numerical control.

15 Claims, 18 Drawing Figures

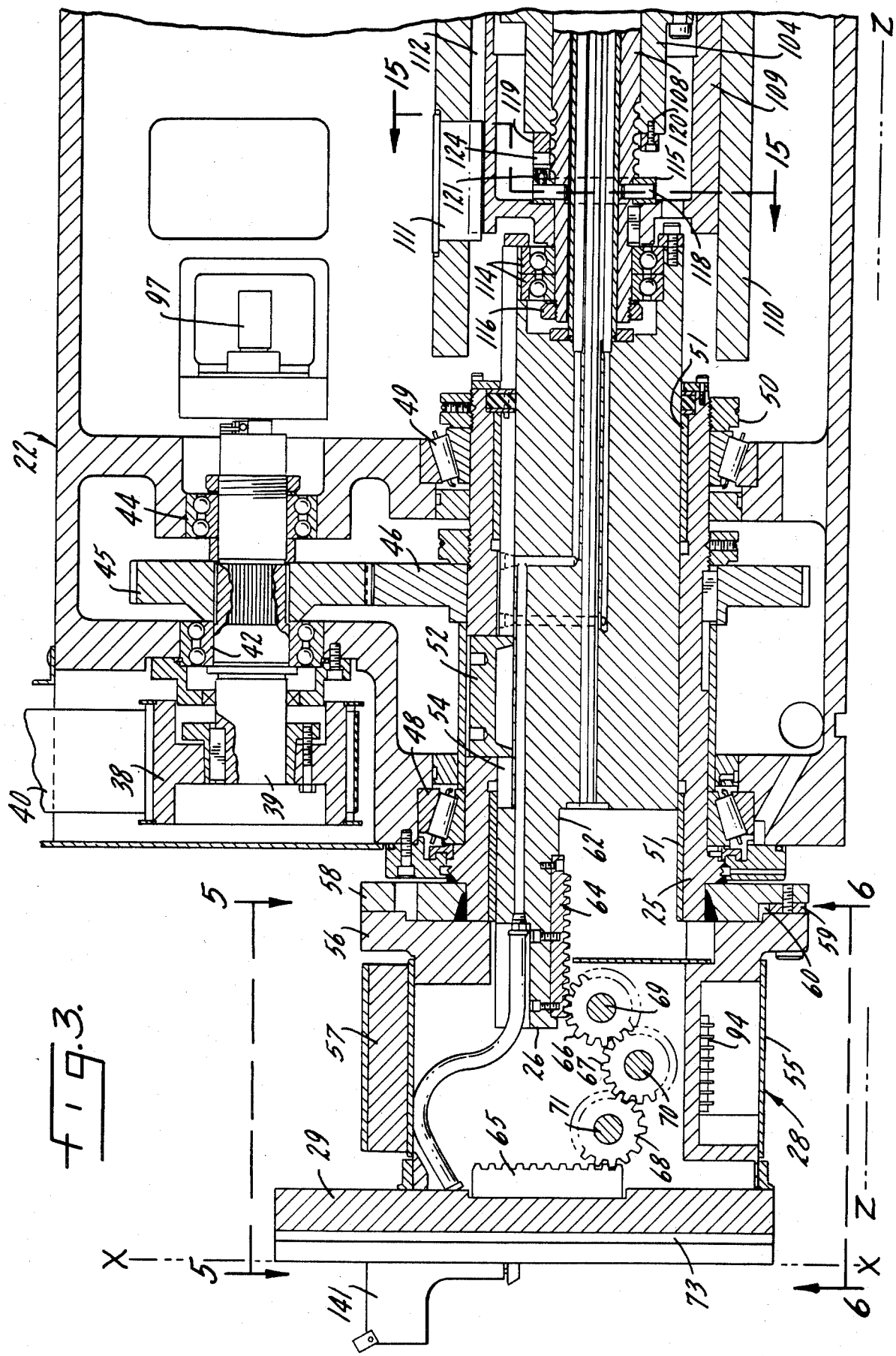

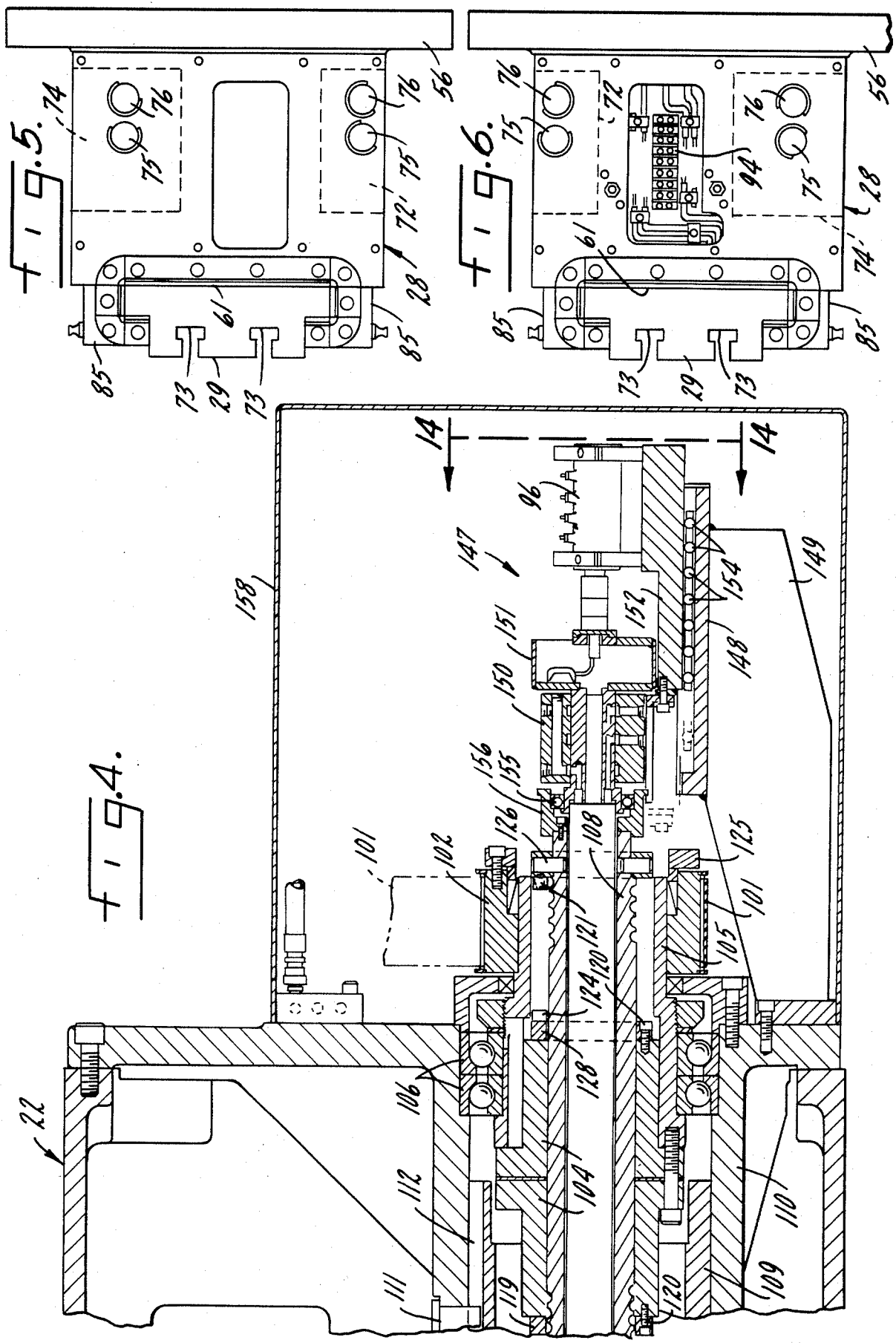

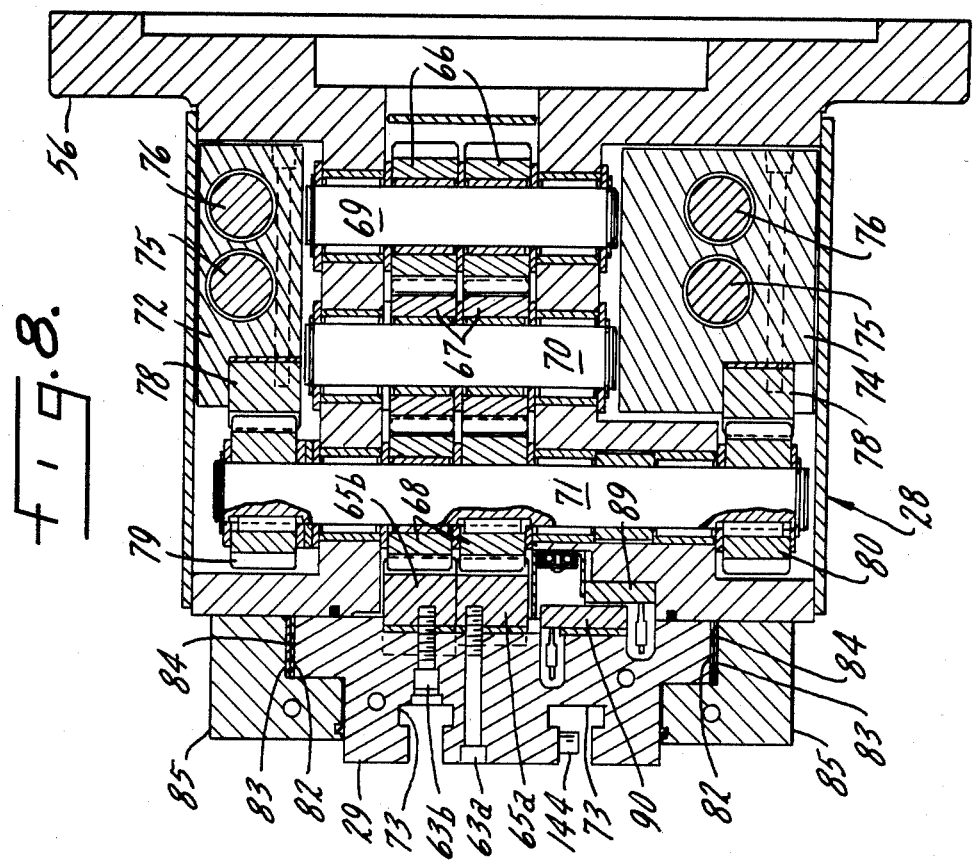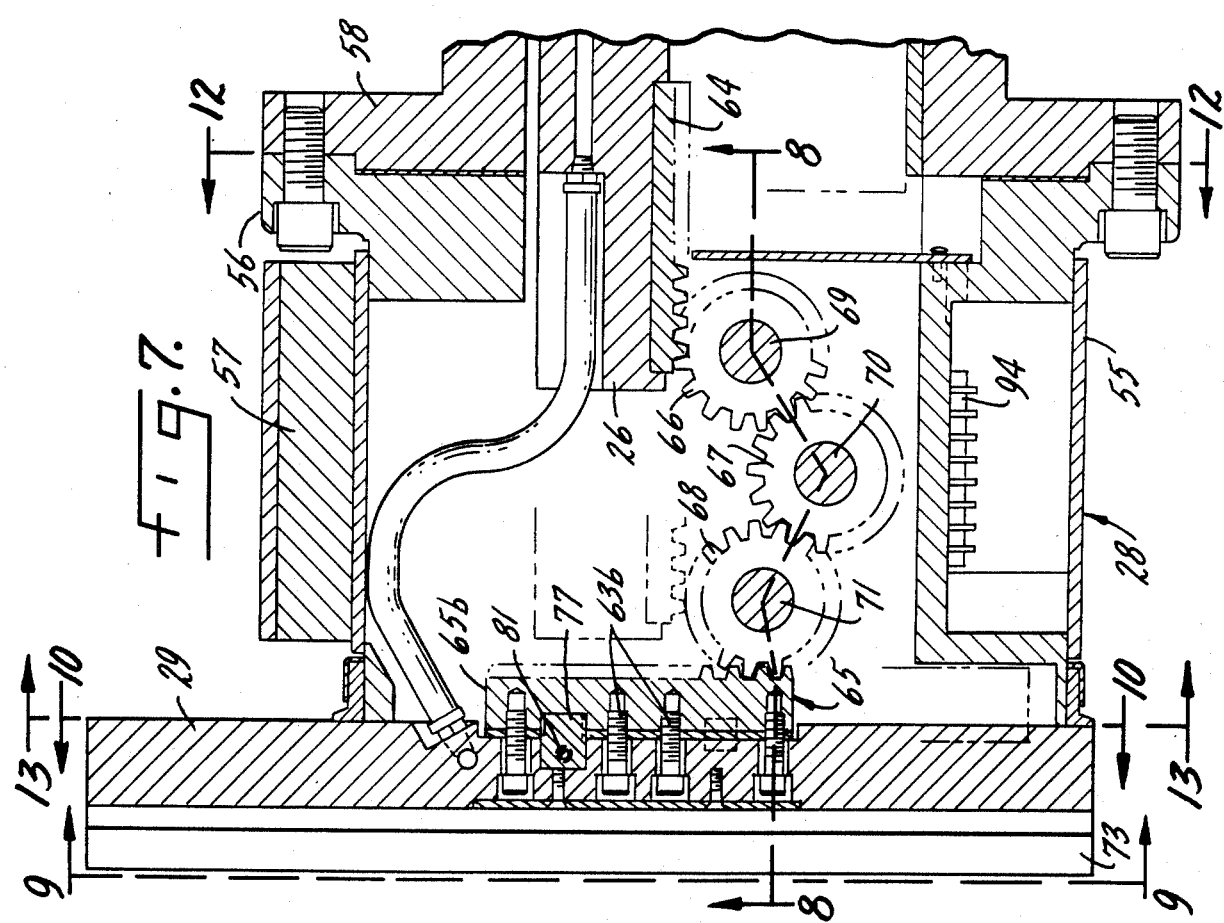

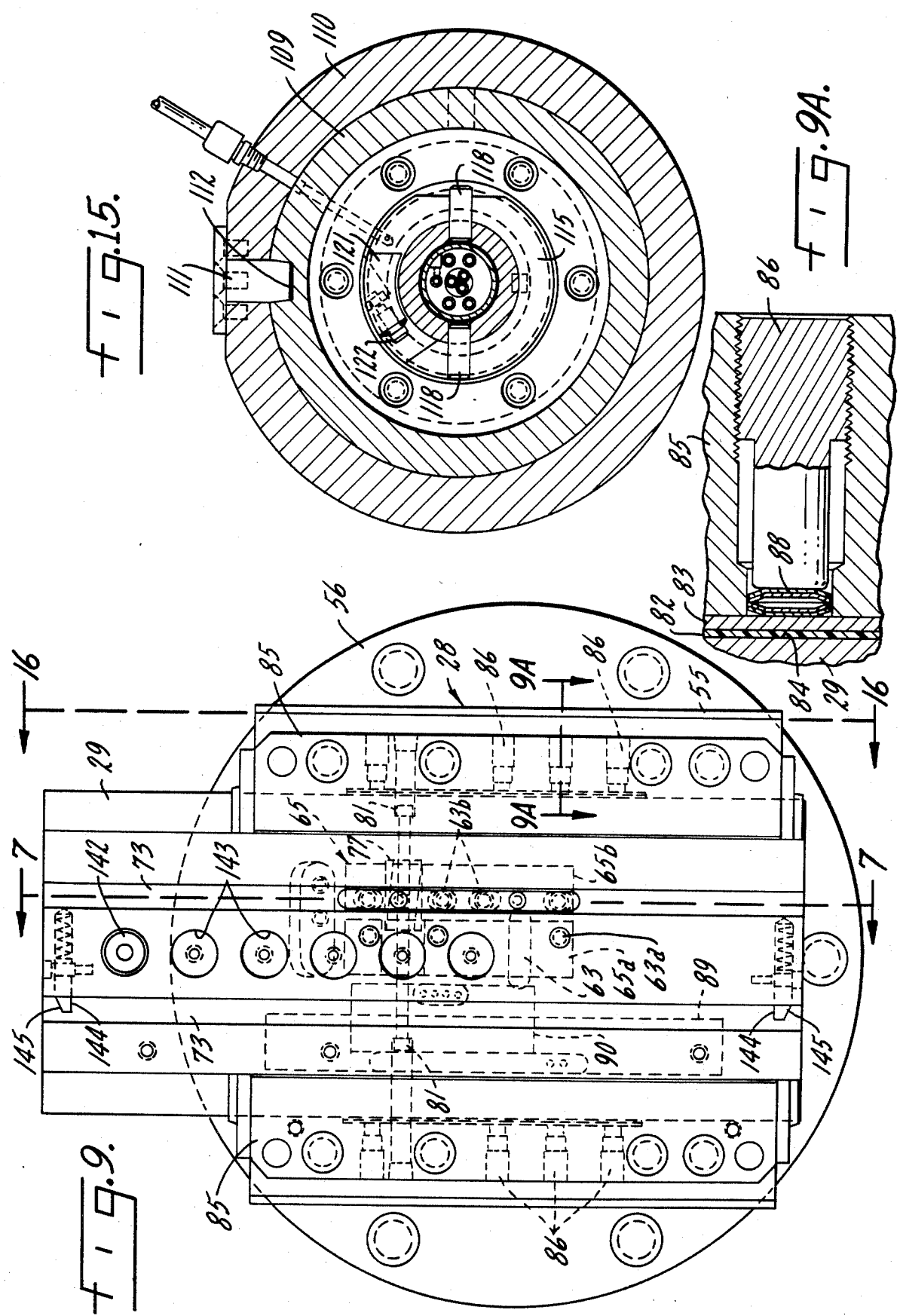

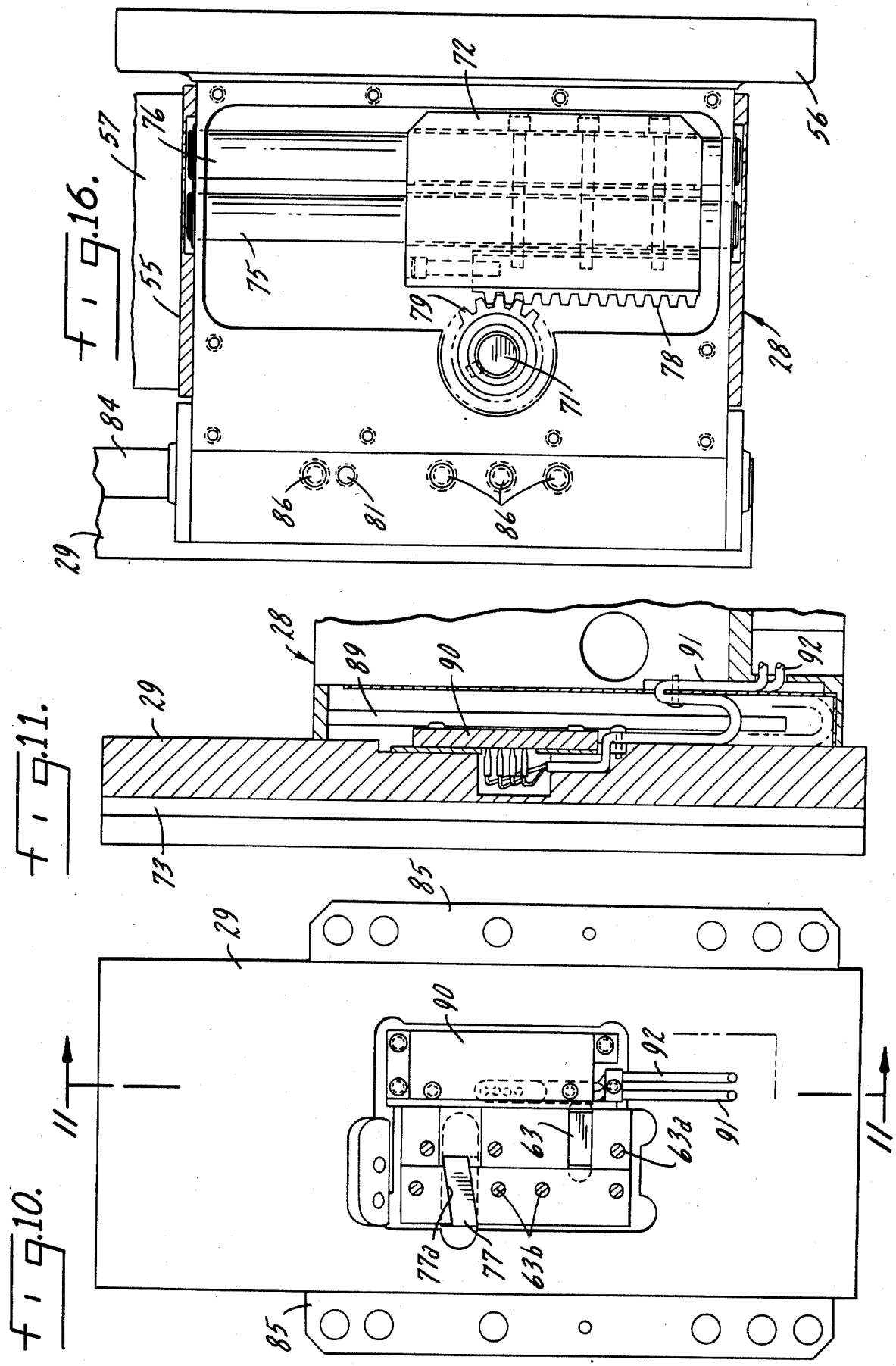

CONTOURING MACHINE WITH RADIAL SLIDE HEAD

FIELD OF THE INVENTION

The present invention relates to a contour boring machine adapted to perform a wide variety of interior and exterior machining operations under numerical control. The machine finds a particular, but not exclusive utility, in performing operations such as boring, facing, grooving, turning and backfacing on relatively large workpieces such as valve housings, gear boxes, pump housings, pipe, and couplings.

BACKGROUND ART

Machine tools utilizing relative motion between the spindle and tool slide for performing boring, contouring and threading work have long been known in the art. Machines of this type are shown, for example, in the following U.S. and foreign patents:

| U.S. Pat. No. | Patentee | U.S. Pat. No. | Patentee |
| --- | --- | --- | --- |
| 2,157,248 | Swanson | 3,592,553 | Heizer |
| 2,404,433 | Christman | 3,686,964 | Thibaut et al. |
| 2,430,026 | Mealey | 3,902,386 | Dressler et al. |
| 2,495,583 | Heron | 4,250,775 | Jerue et al. |
| 2,775,147 | Schneebeli et al. | U.S.S.R. 309,576 | |
| 3,113,475 | Lombardo | W. Ger. 2,405,694 | |
| 3,228,265 | Stoddard et al. | | |

Many of these prior devices are unduly complicated. Some are primarily manually actuated and require frequent adjustment. Some are not sufficiently accurate to produce work that would be considered acceptable by current manufacturing standards. Still others do not readily lend themselves to operation under numerical control.

DESCRIPTION OF THE INVENTION

The general aim of the present invention is to provide a contour boring machine having a rotatable contouring head adapted to perform a wide variety of interior and exterior machining operations with a high degree of accuracy under two axis control.

Another object of the invention is to provide a contour boring machine of the character set forth above utilizing relative motion between a spindle and spindle sleeve to position the radial tool slide of a rotatable contouring head along a first axis, and bodily sliding motion of the entire headstock relative to the machine base along a second axis, both under numerical control.

A further object of the invention is to provide a contour boring machine of the type set forth above including means for sensing the precise position of the radial slide along the first axis and the precise position of the headstock along the second axis and continuously supplying such information to the machine control.

Another object of the invention is to provide a contour boring machine of the character set forth above utilizing a double gear train connected between the spindle and the radial tool slide and adjustment means on the tool slide for removing the backlash from the gear train.

Still another object of the present invention is to provide a machine of the character set forth above wherein the stability of the control loop including the gear train between the spindle and the radial slide is enhanced by application of a predetermined amount of friction between the radial slide and the body of the contouring head.

A further object of the invention is to provide a contour boring machine of the foregoing type including counterbalance means positively connected to and actuated by the gear train between the spindle and the radial slide.

Another object is to provide an arrangement permitting quick attachment and detachment of tools in precise positions on the radial slide, along with fail safe means to prevent a tool from being thrown in event it should accidentally loosen during operation of the machine.

Other objects and advantages of the invention will become apparent from the following detailed description, taken together with the accompanying drawings, wherein.

Figure 2:
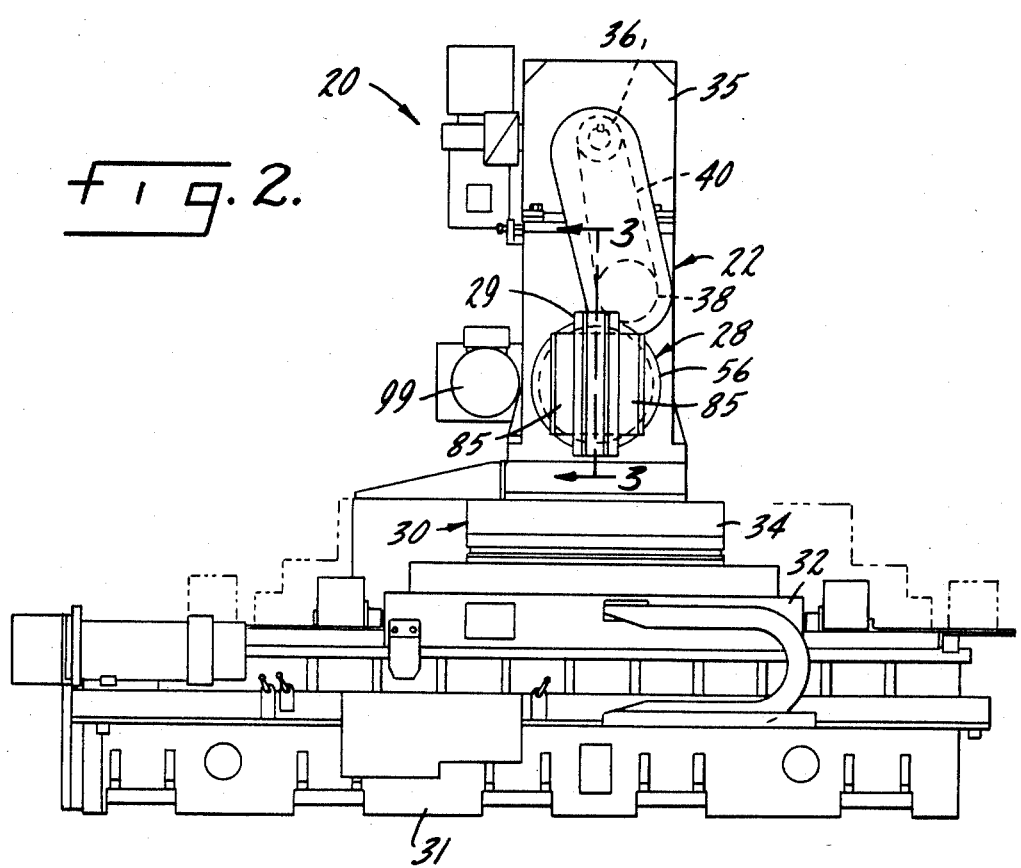
FIG. 2 is a front elevational view showing the contour boring machine of FIG. 1 together with its work holding attachment.

FIGS. 3 and 4 together constitute an enlarged vertical sectional view taken along the spindle axis of the illustrative machine in the plane of the line 3—3 in FIG. 2.

FIG. 5 is a top plan view of the contouring head of the illustrative machine, taken from the plane of the line 5—5 in FIG. 3.

FIG. 6 is a bottom plan view of the contouring head taken from the plane of the line 6—6 in FIG. 3.

FIG. 7 is a further enlarged vertical sectional view through the contouring head, taken in the plane of the line 7—7 in FIG. 9.

FIG. 8 is a broken horizontal sectional view taken through the contouring head in the plane of the line 8—8 in FIG. 7.

FIG. 9 is a front elevational view of the contouring head taken in the plane of the line 9—9 in FIG. 7.

FIG. 9A is an enlarged fragmentary view taken axially through one of the pressure adjustment devices associated with the radial slide in the plane of the line 9A—9A in FIG. 9.

FIG. 10 is a vertical sectional view through the rearward portion of the radial slide, taken in the plane of the line 10—10 in FIG. 7.

FIG. 11 is a vertical sectional view taken through the radial slide in the plane of the line 11—11 in FIG. 10.

Figure 12:
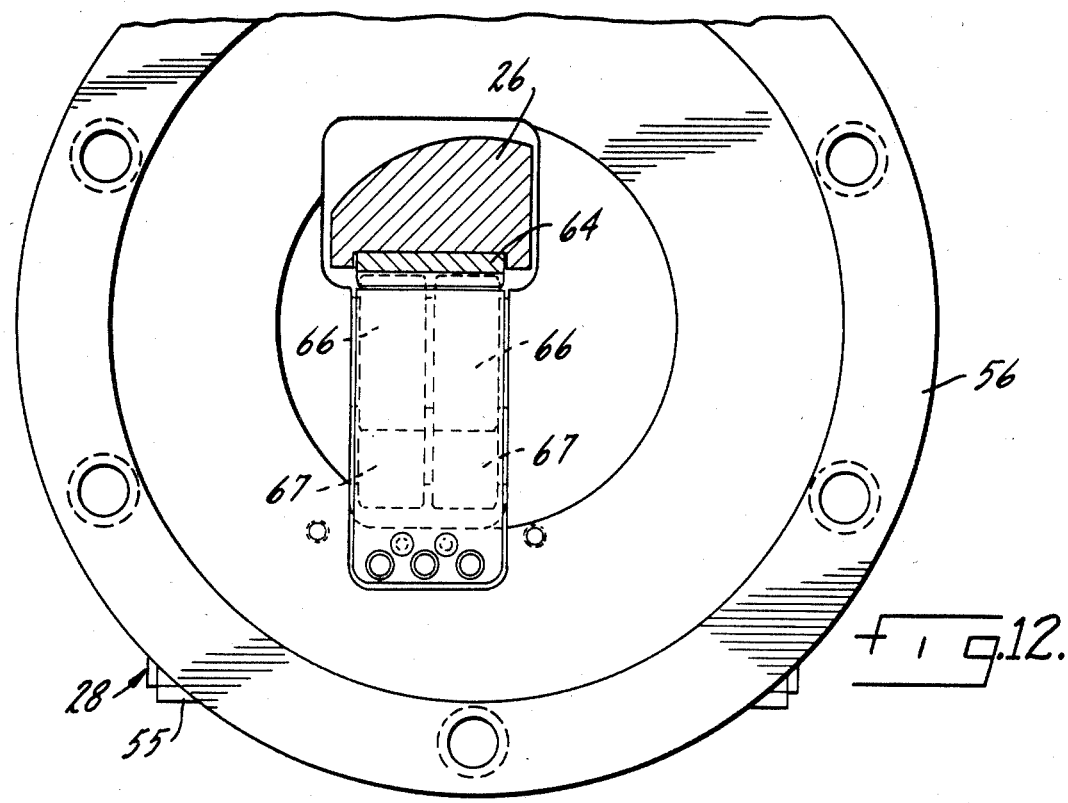

FIG. 12 is a vertical sectional view taken through the forward end portion of the spindle in the plane of the line 12—12 in FIG. 7.

Figure 13:
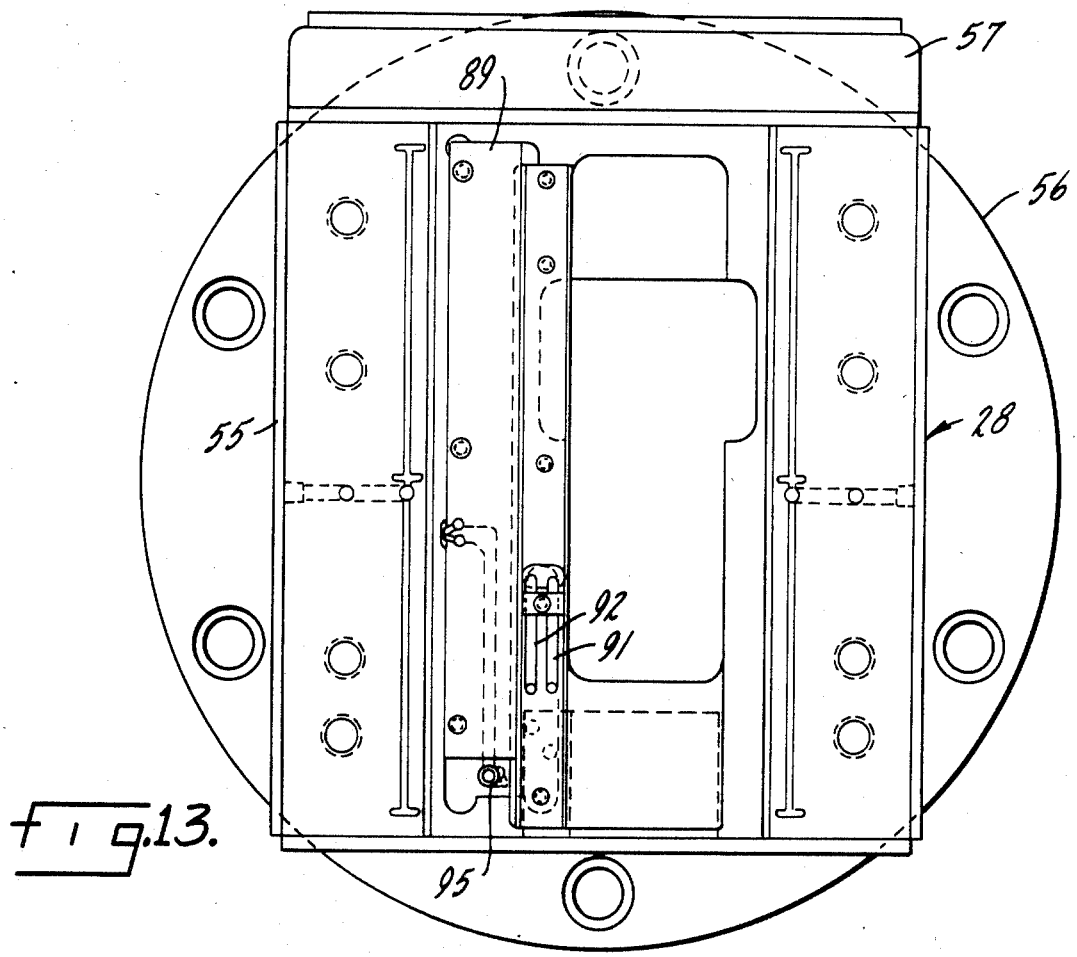

FIG. 13 is an end elevational view of the contouring head taken in the plane of the line 13—13 in FIG. 7 with the radial slide removed.

Figure 14:
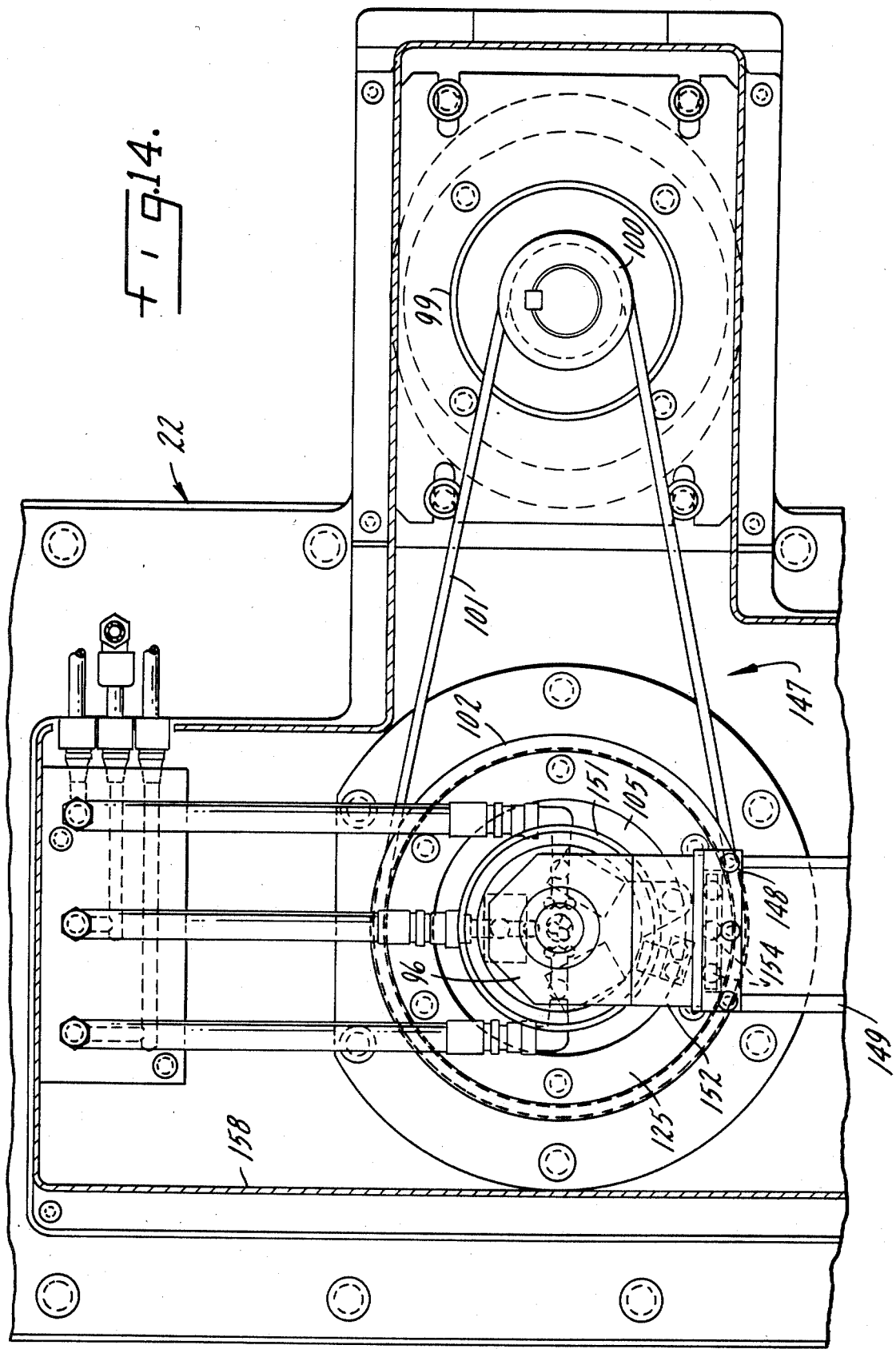

FIG. 14 is an enlarged fragmentary elevational view, partially in section, through the rearward end portion of the headstock and showing the feed motor and drive for spindle actuation of the radial slide.

FIG. 15 is an enlarged fragmentary transverse sectional view taken through the guide ram and stop collar assembly near the front of the ball screw in the plane of the line 15—15 in FIG. 3.

FIG. 16 is a side elevational view of the contouring head with a side panel removed, taken from the plane of the line 16—16 in FIG. 9 and showing the nearest counterweight and its connection to its associated drive pinion.

Figure 17:
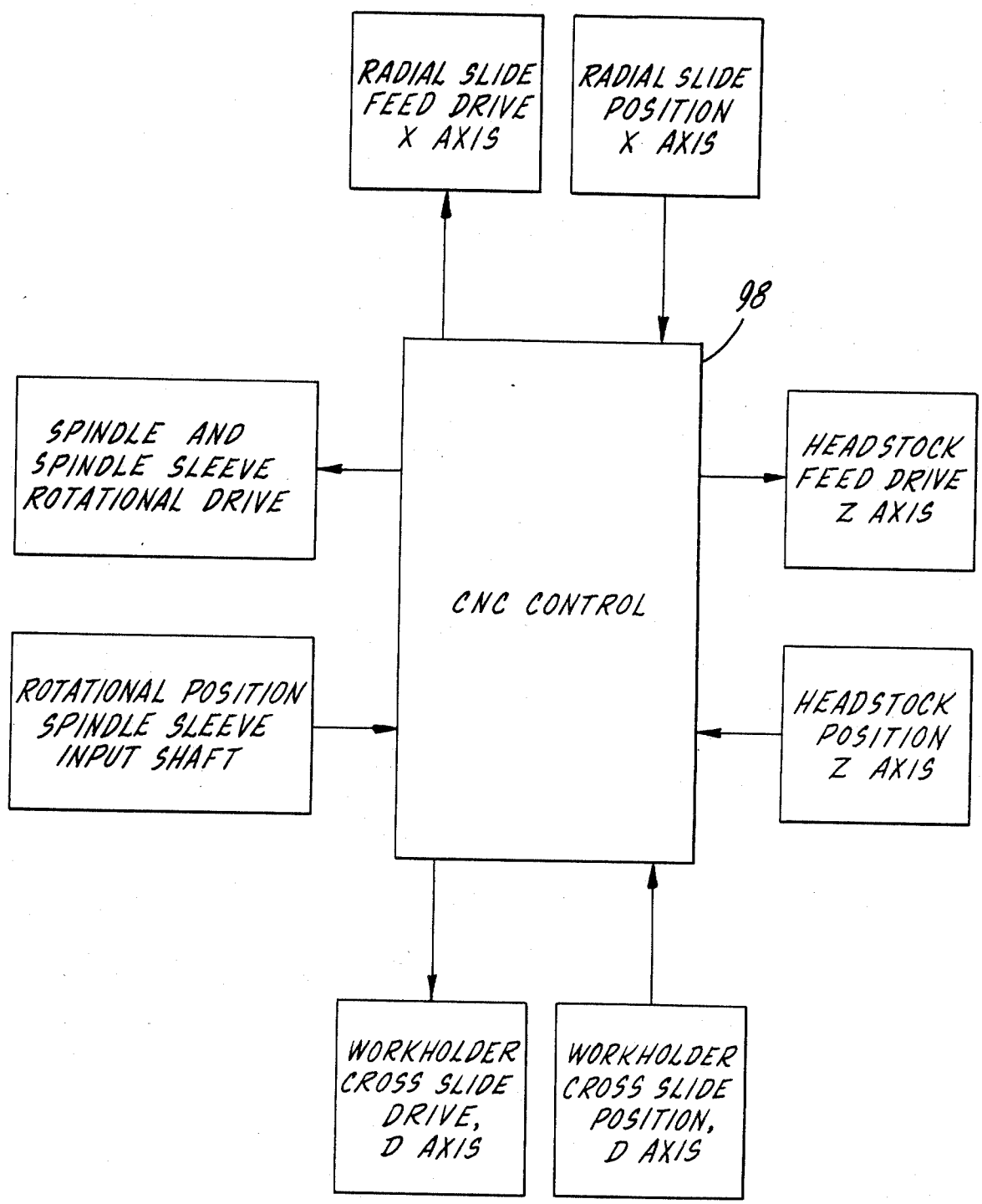

FIG. 17 is a diagrammatic view illustrating the relationship of the numerical control to the exemplary contour boring machine of the present invention and its workholder attachment.

While the invention is susceptible of various modifications and alternative constructions, a certain illustrative embodiment has been shown in the drawings and will be described below in considerable detail. It should be understood, however, that there is no intention to limit the invention to the specific form disclosed but, on the contrary, the intention is to cover all modifications, alternative constructions, and equivalents falling within the scope of the appended claims.

GENERAL MACHINE ORGANIZATION

Figure 1:
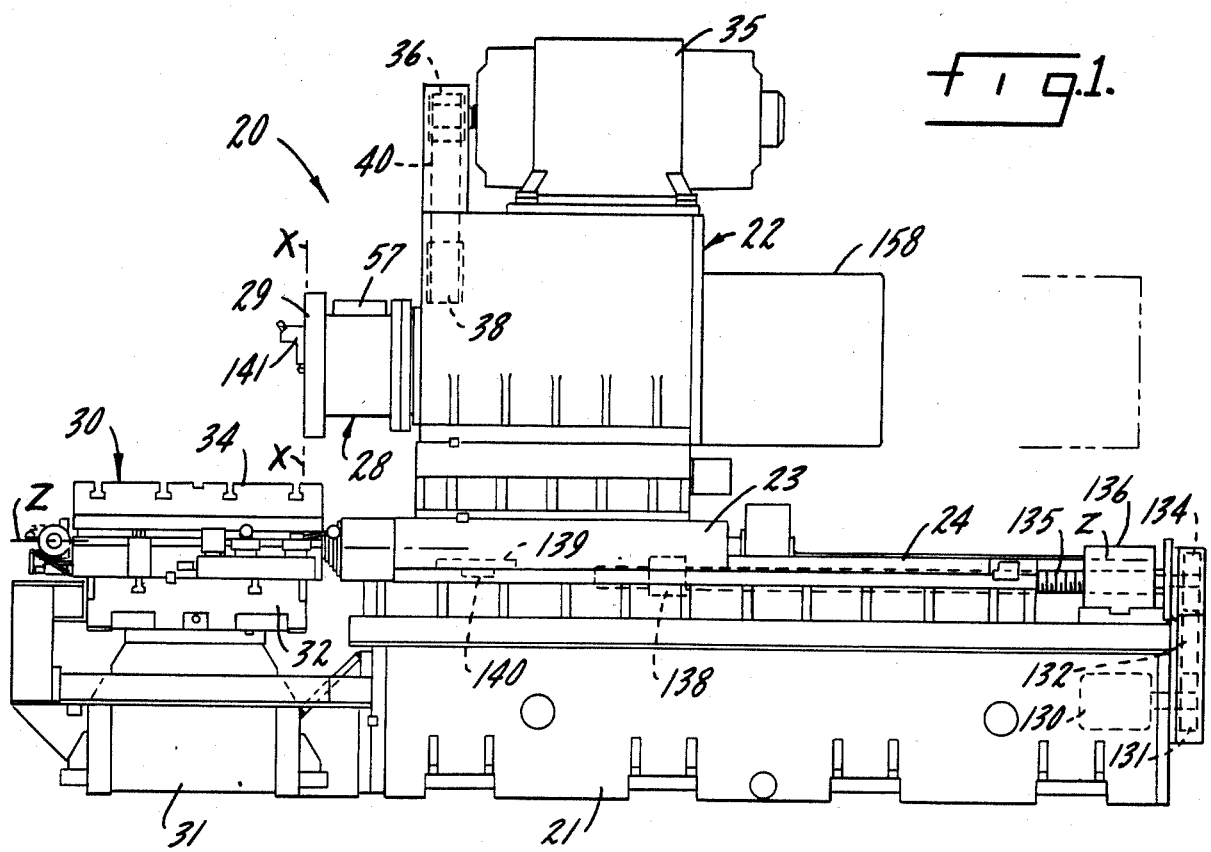
FIG. 1 is a side elevational view of an illustrative contour boring machine exemplifying the present invention.

Referring more specifically to FIGS. 1 and 2, the invention is there exemplified in an illustrative contour boring machine 20. The latter comprises in this instance a generally rectangular, floor mounted base 21 and a headstock 22 supported for reciprocation along axis Z—Z by means of a main slide 23. The latter moves on longitudinal ways 24 on top of the base 21. The headstock 22 has journaled therein a spindle sleeve 25 and spindle 26 which rotate in unison. A contouring head 28 which supports a radially movable tool slide 29 is fixed to the spindle sleeve 25 for rotation in unison therewith. The radial slide 29 is adapted to mount appropriate tools for the machining operations to be performed on the workpiece (not shown).

In the present instance, the machine 20 is equipped with a workholder 30 situated at the end of the machine base 21 adjacent the contouring head. The workholder 30 comprises a floor mounted base 31 which may, but need not be, rigidly fixed to the machine base 21. A cross slide 32 is mounted for reciprocation on top of the base 31 in a direction normal to the longer dimension of the base 21. The cross slide 32, in turn, supports a rotary table 34 to which the workpiece may be attached. By means of the cross slide and rotary table, the workpiece may be oriented into the proper position for machining.

Power for rotating the spindle sleeve, spindle, and contouring head 28 is supplied by a main drive motor 35 mounted on top of the headstock. A drive sheave 36 on the end of the motor shaft is connected to a driven sheave 38 on the headstock input shaft by means of a timing belt or cleat belt 40. The input shaft 39 is journaled in a pair of ball thrust bearings 42, 44 in the headstock housing and has a drive pinion 45 fixed thereto. The latter meshes with a bull gear 46 keyed or otherwise rigidly fixed to the spindle sleeve 25. The spindle sleeve 25 is journaled within the headstock by means of a pair of axially spaced tapered roller bearings 48, 49 which may be preloaded by means of nut 50. The spindle 26 is supported for axial sliding movement within the spindle sleeve by a pair of bushings 51. The spindle is constrained to rotate in unison with the spindle sleeve by means of a main key 52. The latter engages a longitudinal groove 54 somewhat greater in length than the key 52, thereby permitting axial sliding movement of the spindle within the spindle sleeve while maintaining rotation of the two in unison.

THE CONTOURING HEAD

Turning next to FIGS. 3 and 7-9, it will be noted that the contouring head 28 comprises a box-like housing 55 fixed to a circular mounting flange 56. The top wall of the housing has a fixed counterweight 57 rigidly secured thereto. The flange 56 is adapted to register abuttingly with the mounting flange 58 of the spindle sleeve. The flange 56 is securely bolted to the flange 58 and, in addition, is precisely located thereon by means of a suitable key and key slot connection 59, 60 (FIG. 3). At the end of the contouring head opposite the mounting flange 56, the head is formed with a radial guideway or channel 61 (FIGS. 5 and 6) adapted to slidably house the radial slide 29.

Provision is made in the machine 20 for utilizing axial sliding motion of the spindle relative to the spindle sleeve to drive the radial slide 29 on an axis X—X perpendicular to the axis Z—Z of headstock motion. In furtherance of this objective, the outboard end portion of the spindle has a large segmental clearance notch 62. A gear rack 64 is fixed to the underside of that portion of the spindle adjacent the notch 62. A similar gear rack 65 is fixed to the inner face of the radial slide 29 and located centrally thereon but offset laterally a slight amount. A gear train comprising three pinions 66, 67, 68 journaled on shafts 69, 70 and 71, respectively, meshingly connects the racks 64 and 65 for 1:1 ratio movement.

For the purpose of counterbalancing the radial slide 29 and the tooling thereon, the contouring head 28 includes a pair of counterweights 72, 74 (FIGS. 5, 6, 8 and 16). In the present instance, the counterweight 72 is thinner than the counterweight 74 because the gear train is offset from the central plane of the head. Each counterweight is slidably mounted on a pair of guide bars 75, 76 for motion equal and opposite to that of the radial slide 29. Each counterweight thus has a gear rack 78 fixed thereon corresponding in size and number of teeth to the racks 64, 65 on the spindle and the radial slide. Each rack 78 meshingly engages a respective one of a pair of pinions 79, 80 keyed to the overhanging end portions of the shaft 71. The pinions 79, 80 are identical in size and number of teeth to the pinions 68 in the drive train between the spindle rack and the rack of the radial slide. One of the pinions 68, in this case the one on the bottom as viewed in FIG. 8, is drivingly fixed to the shaft 71 to drive its pinions 79, 80. By reason of this arrangement, for every increment of movement of the radial slide 29 along the axis X—X, an equal and opposite movement of the counterweights 72, 74 will also occur along the X—X axis.

Provision is made for increasing the stability of the gear connection between the spindle and radial slide by eliminating, insofar as possible, the perceptible backlash in the gear train. This is accomplished by doubling up the gear train and, in effect, providing two gear trains in parallel between the spindle and the radial slide. Accordingly, it will be noted upon reference to FIG. 12 that the gear rack 64 of the spindle is a double one. Similarly, it will be noted from FIGS. 9 and 10 that the gear rack 65 of the radial slide is also a double one. By the same token, the pinions 66, 67, 68 on the central portions of the shafts 69, 70, 71 are also doubled up. In addition, the double rack 65 on the radial slide is made so that one-half of it will be adjustable longitudinally relative to the other half. This arrangement permits one-half of the gear train to be loaded against the other half, thereby eliminating all of the readily perceptible backlash in the gearing.

Referring more specifically to FIGS. 8, 9 and 10, it will be noted that the half 65a of the rack closest to the center line of the radial slide 29 is positively fixed to the slide as by transverse key 63 and recessed cap screws 63a. The half 65b of the rack farthest from the center line of the slide 29 is adjustably connected to the slide. For this purpose, the rack 65b is held against the slide by means of cap screws 63b recessed in the bottom of overlying T-slot 73. The apertures in the bottom wall of the T-slot surrounding the screws 63b are of oblong shape, permitting adjustment of the rack 65b longitudinally of the slot.

For the purpose of adjusting the rack 65b, a transverse wedge member 77 is adapted to slidably engage a transverse slot 77a in the rack 65b (FIGS. 9, 10). A clearance slot for the wedge member is provided in the rack 65a. The slot 77a is inclined at an angle in the neighborhood of 7 degrees from a plane normal to the long dimension of the rack 65b. A pair of backlash adjusting screws 81 recessed in the plane of the slide 29 threadedly engage the wedge member 77. Upon loosening of the cap screws 63b, the member 77 may be shifted along the inclined slot 77a by the backlash adjusting screws 81 in the proper direction to eliminate perceptible backlash. The rack 65b is then secured in adjusted position by tightening the cap screws 63b.

In order to enhance the stability of the control loop including the gear train 64, 66–68, 65, provision is made for introducing a controlled amount of friction between the radial slide 29 and the fixed part of the contouring head 28 (FIGS. 8, 9). This is accomplished by interposing strips 82 of non-metallic material, in this instance known by the trademark "Rulon", between the lateral edges 84 of the slide 29 and their associated overlying cleat bars 85. The amount of friction may be precisely regulated by the use of means to adjust the normal pressure between each cleat bar 85, the non-metallic strip or shim 82, and the adjacent lateral edge 84 of the radial slide. This is accomplished by utilizing a series of adjusting screws 86 in longitudinally spaced relation along each cleat bar (FIGS. 9, 9A). Interposed between each screw 86 and the non-metallic strip 82 is a friction plate 83 and a small Bellville spring assembly 88, the pressure of which may be adjustably determined by turning the adjusting screw 86 associated therewith. These adjusting screws are set to introduce a predetermined amount of friction sufficient to provide the necessary stability in the system.

Provision is made for continually sensing the radial position of the slide 29 along the guideway or channel 61 on the axis X—X of the contouring head. This is accomplished by the use of an Inductosyn scale 89 fixed to the head 28 and an associated slider 90 fixed to the radial slide 29 (FIGS. 9–11). Appropriate flexible electric leads, in this case two leads 91, 92 each with two conductors, are run from the slider 90 to a terminal block 94 in the base of the head 28 (FIGS. 3, 6). A single lead 95 with two conductors, runs from the scale 89 to the terminal block 94. The latter is connected via a duct through the center of the spindle to an appropriate slip ring assembly 96 at the opposite end of the headstock. The assembly 96 is connected to the numerical control 98 of the machine.

For proper operation of the contouring head, it is important to monitor the rotational speed of the spindle, spindle sleeve and head. This is accomplished by coupling a resolver 97, through an appropriate instrumental gear train, to the end of the headstock input shaft 39 opposite the driven sheave 38. The output of the resolver 97 is transmitted to the machine control 98. Thus any difference between the programmed speed and the actual speed of the contouring head can be immediately detected and rectified.

RADIAL FEED OF TOOL SLIDE

For the purpose of feeding the radial tool slide along the guideway or channel 61 on the X axis, means are provided for moving the spindle 26 axially so as to transmit motion through the gear train to the rack on the back face of the radial slide 29, such motion being substantially free of backlash. Accordingly, a feed motor 99 is mounted on the far side of the headstock (as viewed in FIGS. 1, 3, 4, 14). The motor 99 has a drive sprocket 100, which is connected by a cleat belt 101 to a driven sprocket 102 located on the spindle axis. The driven sprocket 102 is telescoped over and fixed to a ball screw nut 104 via an adapter collar 105. Both the adapter collar and the ball screw nut are journaled in the headstock housing by means of a double ball thrust bearing 106. A hollow ball screw 108 is slidably supported within the ball screw nut in alignment with the axis of the spindle 26.

Adjacent its forward end, the ball screw 108 is slidably supported by means of a cup-shaped cylindrical ram 109 (FIGS. 3, 4, 15). The latter is mounted for axial sliding movement within a large cylindrical hub 110 formed integrally with the headstock housing. The ram 109 is restrained against rotation within the hub 110 by means of a relatively large key 111 which extends radially inward from the hub 110 to engage a keyway slot 112 extending the full length of the ram. At its forward end, the ram 109 is keyed to the forward end portion of the ball screw 108 so as to restrain the latter against rotation. The ram is also axially fixed to the ball screw 108 between a double ball thrust bearing 114 and a stop collar 115. The ball thrust bearing 114 is mounted in a recess in the rearward end of the spindle and restrained axially on the ball screw between a hub on the ram and a nut 116 on the forward end of the ball screw. The connection is such that the ball screw 108 is constrained to move axially with the spindle 26 while being retained against rotation by the ram 109.

In operation, the feed motor 99 rotates the ball screw nut 104 so as to move the ball screw 108, and thus the spindle, axially toward or away from the contouring head. The forward and rearward limits of such axial movement are set by limit switches and the machine control. In event of a switch or control malfunction, however, the emergency limits of axial motion of the ball screw are set by rotary positive stops.

In this case, the rotary positive stops are defined by two pairs of stop collars, one pair adjacent either end of the ball screw (FIGS. 3, 4, 15). The forward pair comprises the stop collar 115, fixed to the ball screw by pins 118, and the stop collar 119 fixed to the forward end of the ball screw nut as by cap screws 120. The stop collar 115 has a resilient abutment 121 extending axially toward the stop collar 119. The resilient abutment carries a spring loaded plunger 122 adapted to intercept a coacting rigid abutment 124 fixed to the collar 119. By reason of this arrangement, the possibility of damage if the stops should engage is minimized.

The rearward pair of stop collars comprises the collar 125, fixed to the rearward end of the ball screw by pins 126, and the stop collar 128, fixed to the rearward end of the ball screw nut as by cap screws 120 (FIG. 4). The stop collar 125 has a resilient abutment 121 like that of the stop collar 115. The stop collar 128 has a rigid abutment 124 like that of the stop collar 119.

AXIAL FEED OF HEADSTOCK

Headstock feed along the Z axis is obtained from feed motor 130 situated on the far side of the base 21 adjacent the right hand end of the base (FIG. 1). The drive sprocket 131 of the motor 130 is connected via a cleat belt 132 to a driven sprocket 134 adjacent the outboard end of a ball screw 135. The latter runs longitudinally of the upper portion of the base 21. The right hand end of the ball screw (as viewed in FIG. 1), is journaled in a bearing 136 situated on top of the machine base 21. The forward end portion of the ball screw is threadedly engaged with a ball screw nut 138 mounted in depending relation from the main slide 23 of the headstock.

The position of the headstock along the Z axis is continually sensed by means of an Inductosyn scale 139 mounted on the main slide of the headstock and a slider 140 mounted on the machine base. These members, shown diagrammatically in the drawing, are identical to the Inductosyn scale and slider already described above in connection with the radial slide 29. The scale and slider 139, 140 are connected to the machine control 98.

TOOL MOUNTING

The radial slide 29 is adapted to hold quick connect and disconnect type tools appropriate for the particular machining operation or operations called for by the control program (FIGS. 1, 3, 5–9). The slide 29 is accordingly formed with a pair of precision T-slots 73 adapted to receive the T-bolt clamping members of a toolholder 141 ready to be mounted in place thereon. In order to achieve precise and repetitive positioning of a particular toolholder each time it is used, the slide 29 is provided with a precision locating boss 142. The latter, shown in uppermost position in FIG. 9, is mounted in a socket 143 in the face of the radial slide 29. The toolholder to be mounted on the slide is slid along the T-slots 73 until it abuts the boss 142, at which point the T-bolts of the holder are tightened and the tool is positioned for accurate machining. A series of precision sockets 143 for the boss 142 are formed in the face of the slide 29 to permit accommodation of a variety of toolholders and machining conditions.

The slide 29 includes means for preventing accidental throwing of a toolholder 141 in the event that its T-bolts should break or become loose during operation of the contouring head (FIGS. 8, 9). Such prevention is accomplished by means of a pair of spring loaded plungers 144 which extend at least halfway across the end of a T-slot so as to preclude accidental removal of a toolholder that has become loose. When the machine is stopped and it is desired to remove the toolholder, the plunger 144 may be easily depressed by a screwdriver or other appropriate tool to release the toolholder from the slide.

In order to facilitate entry of the T-bolts of a toolholder into the T-slots of the head 29, the end portion of each spring loaded plunger 144 adjacent the outer end of the slot may be beveled as at 145. This permits an incoming T-bolt to cam the plunger out of the way so that the T-bolt can proceed into the T-slot.

SERVICE CONNECTIONS TO HEADSTOCK AND HEAD

The service lines for the headstock 22 and contouring head 28 are arranged in a relatively compact assembly 147 located outside the headstock housing for ease of assembly and maintenance (FIGS. 4 and 14). The assembly 147 is supported on a bracket comprising a horizontal plate 148 and a pair of reinforcing ribs 149, the latter fixed to the rear wall of the headstock housing. The service line assembly comprises a fluid manifold 150, an electrical terminal box 151, and the slip ring assembly 96, all coupled together and mounted on a slide 152. The latter is supported on the bracket plate 148 by means of a series of rollers 154. The assembly 147 is connected to the hollow ball screw 108 by means of a ball thrust bearing 155 interposed between the manifold 150 and a collar 156 fixed to the rearward end of the ball screw. This connection causes the service line assembly to move axially in unison with the ball screw while permitting relative rotational movement therebetween.

The service lines from the headstock 22 and the contouring head 28 are routed through an axial passageway in the spindle and a torque tube concentric with the hollow ball screw 108. These include service lines for air, lubricant, and coolant, together with electrical leads from the Inductosyn sensing elements in the contouring head and headstock. The electrical lines are brought through the center of the manifold 150 to the terminal box 151 and thence to the slip ring assembly 96. Flexible fluid lines are then run from the manifold and electrical lines are run from the slip ring assembly to other parts of the machine and the control. The service line assembly 147 is housed in a protective enclosure 158 at the rear of the headstock.

MACHINE CONTROL

The machine 20 may be operated with a variety of automatic controls, or even manually. In the present instance, the machine is particularly well adapted to operate with full CNC control. For work where spindle orientation or thread cutting is desired, CNC control is necessary.

Referring to the schematic diagram in FIG. 17, the numerical control 98 is adapted to execute a machining sequence in accordance with the program derived from tape or another appropriate source. In this case, the sequence involves feeding the radial slide along the X axis while continuously sensing the precise position of the radial slide along that axis; feeding the headstock along the Z axis while continuously sensing the precise position of the headstock along that axis; monitoring the spindle power drive and continuously sensing the rotational position of the headstock drive input shaft relative to the power drive motor to maintain precise speed control; moving the workholder cross slide along its D axis when required and continuously sensing the position of the cross slide on that axis.

We claim as our invention:

1. A numerically controlled contour boring machine adapted for interior and exterior machining operations and comprising, in combination:
   - (a) a machine base;
   - (b) a numerical control;
   - (c) a headstock mounted for sliding movement along a first axis and having drive means actuated by said numerical control for effecting such movement;
   - (d) means connected with said numerical control for continuously sensing the precise position of said headstock along said first axis;
   - (e) a spindle sleeve journaled within said headstock and having drive means actuated by said numerical control for rotating same;

(f) a spindle housed within said spindle sleeve and adapted for axial sliding movement with respect to said sleeve;

(g) a mounting flange fixed to one end of said spindle sleeve;

(h) a contouring head fixed to said mounting flange;

(i) a radial tool slide in said contouring head movable along a second axis;

(j) drive means actuated by said numerical control for feeding said spindle axially toward and away from said contouring head;

(k) gear connection means interposed between said spindle and said radial slide for positioning same along said second axis in response to said axial feeding motion of said spindle;

(l) means for eliminating perceptible backlash from said gear connection means;

(m) means connected with said numerical control for continuously sensing the precise position of said radial tool slide along said second axis;

(n) whereby said machine is adapted to execute a machining sequence with said contouring head.

2. A numerically controlled contour boring machine as set forth in claim 1, wherein said second axis is perpendicular to said first axis.

3. A numerically controlled contour boring machine adapted for interior and exterior machining operations and comprising, in combination:

(a) a machine base;

(b) a numerical control;

(c) a headstock mounted for sliding movement along a first axis having drive means actuated by said numerical control;

(d) means connected with said numerical control for sensing the position of said headstock along said first axis;

(e) a spindle sleeve journaled within said headstock and having rotational drive means actuated by said numerical control;

(f) a spindle housed within said spindle sleeve and adapted for axial sliding movement with respect thereto;

(g) a mounting flange fixed to one end of said spindle sleeve;

(h) a contouring head fixed to said mounting flange;

(i) a radial tool slide in said contouring head movable along a second axis defined by a channel in said head;

(j) drive means connected with said numerical control for feeding said spindle axially relative to said contouring head;

(k) gear connection means interposed between said spindle and said radial slide for positioning same along said second axis in response to said axial feeding of said spindle;

(l) means connected with said numerical control for sensing the position of said radial slide along said second axis;

(m) means on said radial slide for eliminating backlash from said gear connection; and (n) means including a resiliently biased nonmetallic shim interposed between a wall of said channel and a lateral edge of said radial slide for introducing a predetermined amount of friction between said radial slide and said contouring head;

(o) whereby said headstock, said spindle sleeve, said spindle, said radial tool slide, and said contouring head are adapted to execute a machining operation through said numerical control.

4. A numerically controlled contour boring machine as recited in claim 3, wherein the combined motion of said headstock and said radial slide along their respective intersection axes generates a programmed contour in the workpiece.

5. A numerically controlled contour boring machine adapted for interior and exterior machining operations as recited in claim 3, and which further includes:

(m) means for introducing a predetermined amount of friction between said radial slide and said contouring head comprising a pair of resiliently biased nonmetallic shims interposed between the opposed side walls of said channel and the lateral edges of said radial slide.

6. A numerically controlled contour boring machine as recited in claim 1, wherein said radial slide has T-slots and a precision locating boss for positioning a toolholder longitudinally of said T-slots; means for securing quick connect and disconnect type toolholders, and safety catch means disposed across one said T-slot for precluding the throwing of a toolholder in the event that the securing means should loosen.

7. A numerically controlled contour boring machine adapted for interior and exterior machining operations and comprising, in combination:

(a) a machine base;

(b) a numerical control;

(c) a headstock mounted for sliding movement along a first axis having a first drive means actuated by said numerical control;

(d) means connected with said numerical control for sensing the precise position of said headstock along said first axis;

(e) a spindle sleeve journaled within said headstock and having a second drive means actuated by said numerical control for rotating said sleeve;

(f) a spindle housed within said spindle sleeve and adapted for axial sliding movement with respect thereto;

(g) a mounting flange fixed to one end of said spindle sleeve;

(h) a contouring head fixed to said mounting flange;

(i) a third drive means connected with said numerical control for feeding said spindle axially toward and away from said contouring head;

(j) a radial tool slide in said contouring head movable along a second axis;

(k) means connected with said numerical control for sensing the position of said radial slide along said second axis;

(l) gear connection means interposed between said spindle and said radial slide for positioning same along said second axis in response to said axial feeding motion of said spindle;

(m) means for eliminating perceptible backlash from said gear connection means;

(n) means on said radial slide for securing quick connect and disconnect type toolholders to said slide, said securing means including T-slots and safety catch means for precluding the throwing of a toolholder if the securing means should loosen; and (o) said safety catch means comprising a resiliently located plunger disposed across at least one said T-slot.

8. A numerically controlled contour boring machine adapted for interior and exterior machining operations and having a base, said machine comprising the combination of:

(a) a headstock mounted for sliding movement along a first axis;
(b) a numerical control;
(c) means for feeding said headstock along said first axis actuated by said numerical control; said feeding means comprising a ball screw, a ball nut, and a feed motor drive connected to said ball screw;
(d) means connected with said numerical control for continuously sensing the position of said headstock along said first axis;
(e) a spindle sleeve drivingly journaled within said headstock;
(f) a spindle housed within said spindle sleeve and adapted for axial sliding movement with respect thereto;
(g) a mounting flange fixed to one end of said spindle sleeve;
(h) a contouring head fixed to said mounting flange;
(i) a radial tool slide in said contouring head movable along a second axis;
(j) a rack on said spindle;
(k) a rack on said radial tool slide;
(l) a double gear train disposed for transmission of power between said racks to move said radial tool slide along said second axis in response to axial movement of said spindle;
(m) power means actuated by said numerical control for effecting said axial movement of said spindle, said power means comprising a ball screw, a ball nut, and a feed motor drive connected to said ball nut;
(n) means on said radial slide for eliminating perceptible backlash from said gear train, said means including one of said racks being made in two halves and wedge adjustment means interposed between said rack halves to eliminate backlash; and
(o) means connected with said numerical control for continuously sensing the position of said radial tool slide along said second axis during a machining operation.

9. A numerically controlled contour boring machine as set forth in claim 8, including:
means for introducing a predetermined amount of friction between said radial tool slide and said contouring head body to stabilize feeding of said radial slide.

10. A numerically controlled contour boring machine adapted for interior and exterior machining operations and having a base, said machine comprising the combination of:
(a) a headstock mounted for sliding movement along a first axis;
(b) a numerical control;
(c) a first drive means actuated by said numerical control for feeding said headstock along said first axis, said drive means comprising a first ball screw; a ball nut, and a feed motor drive connected to said ball screw;
(d) a spindle sleeve journaled within said headstock and having a second drive means actuated by said numerical control for rotating same;
(e) said second drive means including a headstock power drive motor, a headstock input shaft, and a drive connection to said spindle sleeve;
(f) a spindle housed within said spindle sleeve and adapted for axial sliding movement with respect thereto;
(g) a mounting flange fixed to one end of said spindle sleeve;
(h) a contouring head fixed to said mounting flange;
(i) a radial tool slide in said contouring head movable along a second axis;
(j) a gear train interposed between said spindle and said radial slide;
(k) means for feeding said radial tool slide along said second axis in response to axial movement of said spindle;
(l) means connected with said numerical control for continuously sensing radial slide position along said second axis and interposed between said radial slide and the body of said contouring head;
(m) a third drive means actuated by said numerical control for effecting said axial movement of said spindle and comprising a second ball screw, a ball nut, and a feed motor drive connected to said ball nut; and
(n) means connected to said numerical control and coupled to said headstock input shaft for continuously sensing its rotational position to eliminate discrepancy between programmed speed and actual speed of said contouring head.

11. A numerically controlled contour boring machine adapted for interior and exterior machining operations and having a base, said machine comprising the combination of:
(a) a headstock mounted for sliding movement along a first axis;
(b) a numerical control;
(c) a first drive means actuated by said numerical control for feeding said headstock along said first axis, said drive means comprising a first ball screw, a ball nut, and a feed motor drive connected to said ball screw;
(d) a spindle sleeve journaled within said headstock and having a second drive means actuated by said numerical control for rotating same;
(e) a spindle housed within said spindle sleeve and adapted for axial sliding movement with respect thereto;
(f) a mounting flange fixed to one end of said spindle sleeve;
(g) a contouring head fixed to said mounting flange;
(h) a radial tool slide in said contouring head movable along a second axis;
(i) a gear train interposed between said spindle and said radial slide;
(j) means for feeding said radial tool slide along said second axis in response to axial movement of said spindle;
(k) a third drive means actuated by said numerical control for effecting said axial movement of said spindle and comprising a second ball screw, a ball nut, and a feed motor drive connected to said ball nut;
(l) means on said radial slide for eliminating perceptible backlash from said gear train; and
(m) said second ball screw being hollow and defining therein a longitudinal passage for fluid service lines and electric cables to the service line assembly at the rear of said headstock.

12. A contour boring machine as recited in claim 11, wherein means connected with said numerical control for continuously sensing radial slide position along said second axis are interposed between said radial slide and the body of said contouring head.

13. A contour boring machine as set forth in claim 12, wherein
said second ball screw and ball nut have rotary positive stops including resilient abutments to avoid damage upon engagement.

14. A numerically controlled contour boring machine adapted for interior and exterior machining operations and comprising the combination of:
(a) a machine base;
(b) a numerical control;
(c) a headstock mounted on ways fixed to said base for sliding movement along a first axis parallel to said ways and having a first drive means actuated by said numerical control;
(d) means connected with said numerical control for sensing the position of said headstock along said first axis;
(e) a spindle sleeve journaled within said headstock and having a second drive means actuated by said numerical control for rotating said sleeve;
(f) a spindle housed within said spindle sleeve and adapted for axial sliding movement with respect thereto;
(g) a third drive means actuated by said numerical control for feeding said spindle axially relative to said spindle sleeve;
(h) a mounting flange fixed to one end of said spindle sleeve;
(i) a contouring head fixed to said mounting flange;
(j) a radial tool slide in said contouring head movable along a second axis perpendicular to said first axis;
(k) means connected with said numerical control for sensing the position of said radial tool slide along said second axis;
(l) a first ball screw connected to said spindle for axial sliding movement in unison therewith but restrained against rotation with respect thereto;
(m) a radial slide feed motor actuated by said numerical control drivingly connected to said first ball screw and adapted to position said radial tool slide along said second axis;
(n) a double rack fixed to the outer end portion of said spindle;
(o) a second double rack fixed to the inner face of said radial tool slide;
(p) a gear train drivingly interposed between said racks;
(q) adjustable wedge means interposed between the halves of one of said double racks to eliminate backlash from said gear train;
(r) a pair of counterweights disposed within said contouring head for movement on guide means along said second axis; and
(s) rack means on said counterweights disposed in meshing engagement with said gear train for equal and opposite movement with respect to said radial slide.

15. A numerically controlled contour boring machine adapted for interior and exterior machining operations and which comprises, in combination:
(a) a machine base;
(b) a numerical control;
(c) a headstock mounted on ways fixed to said base for sliding movement under said numerical control along a first axis parallel to said ways;
(d) a headstock feed motor actuated by said numerical control;
(e) a first ball screw mounted on said base, said ball screw having one end drivingly connected to said headstock feed motor;
(f) a ball nut fixed to said headstock and disposed in engagement with the opposite end of said ball screw to drive said headstock along said first axis;
(g) means connected with said numerical control for continuously sensing the precise position of said headstock along said first axis;
(h) a spindle sleeve journaled within said headstock and having means actuated by said numerical control for rotating said sleeve;
(i) a spindle housed within said spindle sleeve and adapted for axial sliding movement with respect thereto;
(j) means actuated by said numerical control for driving said spindle axially relative to said spindle sleeve;
(k) a mounting flange fixed to one end of said spindle sleeve;
(l) a contouring head fixed to said mounting flange;
(m) a radial tool slide in said contouring head movable along a second axis perpendicular to said first axis;
(n) a second ball screw connected to said spindle for said axial sliding movement in unison therewith but restrained against rotation with respect thereto;
(o) a radial slide feed motor drivingly connected to said second ball screw and adapted to position said radial tool slide along said second axis;
(p) means connected with said numerical control for sensing the position of said radial tool slide along said second axis;
(q) a double rack fixed to the outer end portion of said spindle;
(r) a second double rack fixed to the inner face of said radial tool slide;
(s) a gear train drivingly interposed between said racks;
(t) adjustable wedge means interposed between the halves of one of said double racks to eliminate backlash from said gear train;
(u) a pair of counterweights disposed within said contouring head for movement on guide means along said second axis; and
(v) rack means on said counterweights disposed in meshing engagement with said gear train for equal and opposite movement with respect to said radial slide.

* * * * *